US012391094B2

(12) United States Patent
Ali et al.

(10) Patent No.: US 12,391,094 B2
(45) Date of Patent: Aug. 19, 2025

(54) SYSTEM AND METHOD OF HARVESTING WIRELESS ENERGY FOR CLIMATE CONTROL IN A VEHICLE

(71) Applicant: GM Global Technology Operations LLC, Detroit, MI (US)

(72) Inventors: Kamran Ali, Troy, MI (US); Jinzhu Chen, Troy, MI (US); Pasit Asavisanu, Los Angeles, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 254 days.

(21) Appl. No.: 18/063,779

(22) Filed: Dec. 9, 2022

(65) Prior Publication Data

US 2024/0190207 A1   Jun. 13, 2024

(51) Int. Cl.
*B60H 1/00* (2006.01)
*H02J 50/00* (2016.01)
*H02J 50/20* (2016.01)

(52) U.S. Cl.
CPC ..... *B60H 1/00792* (2013.01); *B60H 1/00807* (2013.01); *H02J 50/001* (2020.01); *H02J 50/20* (2016.02)

(58) Field of Classification Search
CPC ............ B60H 1/00792; B60H 1/00807; B60H 1/00007; H02J 50/001; H02J 50/20; B60R 16/03
See application file for complete search history.

(56) References Cited

U.S. PATENT DOCUMENTS

| | | | |
|---|---|---|---|
| 2006/0119306 A1* | 6/2006 | Hampo | B60L 58/33 318/623 |
| 2008/0053128 A1* | 3/2008 | Takeda | B60H 1/00821 62/244 |
| 2017/0138627 A1* | 5/2017 | Han | F24F 11/80 |
| 2019/0283529 A1* | 9/2019 | MacNeille | B60H 1/00771 |
| 2021/0291619 A1* | 9/2021 | Aghniaey | B60W 50/10 |
| 2023/0134091 A1* | 5/2023 | Yoon | H02J 50/10 307/149 |
| 2023/0288529 A1* | 9/2023 | Raz | H01Q 21/065 |
| 2024/0059123 A1* | 2/2024 | Harper | B60H 1/143 |

* cited by examiner

*Primary Examiner* — Jelani A Smith
*Assistant Examiner* — Toya Pettiegrew
(74) *Attorney, Agent, or Firm* — Vivacqua Crane, PLLC

(57) ABSTRACT

Systems and methods of harvesting wireless energy for climate control in a cabin of a vehicle are provided. The method comprises receiving an electromagnetic (EM) signal of EM radiation having EM energy to define an EM current. The method further comprises filtering the EM energy to regulate the EM current converting the EM current to direct current. The method further comprises storing the direct current for powering a battery-free wireless sensing unit and powering the battery-free wireless sensing unit with the direct current. After powering the battery-free wireless sensing unit, the method comprises sensing an actual condition in the cabin, the actual condition being one of actual temperature and actual humidity in the cabin. Furthermore, the method comprises adjusting one of temperature and humidity in the cabin in response to a difference between the actual condition and a set condition.

3 Claims, 5 Drawing Sheets

SYSTEM AND METHOD OF HARVESTING WIRELESS ENERGY FOR CLIMATE CONTROL IN A VEHICLE

INTRODUCTION

The present disclosure relates to climate control sensor units and, more particularly, climate control sensor units for harvesting wireless energy and controlling climate in a cabin of a vehicle.

Climate control is common and needed in a cabin of a vehicle. However, deploying wired or battery-based sensor units can be complex and cumbersome.

SUMMARY

Thus, while current climate control units achieve their intended purpose, there is a need for a new and improved climate control unit and a method of harvesting wireless energy for climate control in a cabin of a vehicle.

In accordance with one aspect of the present disclosure, a battery-free wireless climate control unit for harvesting wireless energy and for controlling climate in a cabin of a vehicle is provided. The climate control unit comprises an antenna having a transceiver arranged to receive an electromagnetic (EM) signal of EM radiation having EM energy to define an EM current. In this aspect, the climate control unit further comprises a wireless energy harvesting (WEH) unit in communication with the antenna. The WEH unit is arranged to filter the EM energy to regulate or resist the EM current. Moreover, the WEH unit is arranged to convert the EM current to direct current.

Further to this aspect, the climate control unit comprises a power management (PM) unit in communication with the WEH unit. The PM unit is arranged to store the direct current and arranged to distribute the direct current. Moreover, the climate control unit further comprises a sensor in communication with the PM unit. In this aspect, the sensor is arranged to receive the direct current from the PM unit for power. Additionally, the sensor is arranged to sense an actual condition being one of temperature and humidity in the cabin. Further, the sensor is arranged to transmit a cabin signal of the actual condition.

Furthermore, the climate control unit further comprises a controller in communication with the sensor and the PM unit. In this aspect, the controller is arranged to receive the direct current from the PM unit for power. Moreover, the controller is arranged to receive the cabin signal of the actual condition from the sensor. Additionally, the controller is arranged to adjust one of temperature and humidity in the cabin in response to a difference between the actual condition and a set condition. In this aspect, the set condition is one of a preset temperature and a preset humidity in the cabin.

In one embodiment, the sensor is arranged to sense a plurality of actual conditions across a plurality of locations in the cabin. In this embodiment, the controller is arranged to create a heat map of the cabin from at least a portion of the plurality of actual conditions by way of an interpolation technique with respect to time and area of the cabin. Additionally, the controller is arranged to adjust one of temperature and humidity in the cabin with the interpolation technique in response to a difference between the plurality of the actual conditions and a corresponding plurality of the set conditions with the area of the cabin.

In another embodiment of this aspect, the sensor is arranged to sense an outside condition being one of temperature and humidity outside of the vehicle. Moreover, the sensor is arranged to transmit an outside signal of the outside condition. In this embodiment, the controller is arranged to receive the outside signal of the outside condition from the sensor. Additionally, the controller is arranged to adjust one of temperature and humidity in the cabin in response to the outside signal and the difference between the actual condition and the set condition.

In yet another embodiment, the antenna extends from the sensor for at least 5 centimeters (cm). In still another embodiment, the sensor has a response time of at least 1 millisecond (ms).

In accordance with another aspect of the present disclosure, a method of harvesting wireless energy for climate control in a cabin of a vehicle is provided. The method comprises providing a battery-free wireless sensing unit for a climate control unit of the vehicle and receiving an electromagnetic (EM) signal of EM radiation having EM energy to define an EM current. The method further comprises filtering the EM energy to regulate the EM current and, after filtering, converting the EM current to direct current.

In this aspect, the method further comprises storing the direct current for powering the battery-free wireless sensing unit and powering the battery-free wireless sensing unit with the direct current. After powering the battery-free wireless sensing unit, the method further comprises sensing an actual condition in the cabin. The actual condition is one of actual temperature and actual humidity in the cabin.

Furthermore, the method comprises adjusting one of temperature and humidity in the cabin in response to a difference between the actual condition and a set condition. The set condition is one of a preset temperature and a preset humidity in the cabin.

In one example, sensing the actual condition in the cabin comprises sensing a plurality of actual conditions across a plurality of locations in the cabin. In this example, adjusting one of temperature and humidity in the cabin comprises creating a heat map of the cabin from at least a portion of the plurality of actual conditions by way of an interpolation technique with respect to time and area of the cabin. In this example, adjusting one of temperature and humidity in the cabin further comprises adjusting one of temperature and humidity in the cabin with the interpolation technique in response to a difference between the plurality of the actual conditions and a corresponding plurality of the set conditions with the area of the cabin.

In another example, sensing the actual condition in the cabin comprises sensing an outside condition being one of temperature and humidity outside the vehicle. In this example, adjusting one of temperature and humidity in the cabin comprises adjusting one of temperature and humidity in the cabin in response to the outside condition and the difference between the actual condition and the set condition.

In accordance with yet another aspect of the present disclosure, a system for harvesting wireless energy for climate control in a cabin of a vehicle is provided. The system comprises a heating, ventilation, and cooling (HVAC) unit disposed in the vehicle for heating, venting, and cooling the cabin of the vehicle.

In this aspect, the system further comprises a climate control unit in communication with the HVAC unit. The climate control unit comprises an antenna having a transceiver arranged to receive an electromagnetic (EM) signal of EM radiation having EM energy to define an EM current. The climate control unit further comprises a wireless energy harvesting (WEH) unit in communication with the antenna. In this aspect, the WEH unit is arranged to filter the EM energy to regulate the EM current. Moreover, the WEH unit is arranged to convert the EM current to direct current.

In accordance with this aspect, the climate control unit further comprises a power management (PM) unit in communication with the WEH unit. The PM unit is arranged to store the direct current. Additionally, the PM unit is arranged to distribute the direct current.

Moreover, the climate control unit comprises a sensor in communication with the PM unit. In this aspect, the sensor is arranged to receive the direct current from the PM unit for power. Moreover, the sensor is arranged to sense an actual condition being one of temperature and humidity in the cabin. Further, the sensor is arranged to transmit a cabin signal of the actual condition.

In this aspect, the climate control unit comprises a controller in communication with the sensor and the PM unit. The controller is arranged to receive the direct current from the PM unit for power. Moreover, the controller is arranged to receive the cabin signal of the actual condition from the sensor. Furthermore, the controller arranged to activate the HVAC unit to adjust one of temperature and humidity in the cabin in response to a difference between the actual condition and a set condition. The set condition is one of a preset temperature and a preset humidity in the cabin.

In one embodiment, the sensor is arranged to sense a plurality of actual conditions across a plurality of locations in the cabin. In this embodiment, the controller is arranged to create a heat map of the cabin from at least a portion of the plurality of actual conditions by way of an interpolation technique with respect to time and area of the cabin. Moreover, the controller is arranged to adjust one of temperature and humidity in the cabin with the interpolation technique in response to a difference between the plurality of the actual conditions and a corresponding plurality of the set conditions with the area of the cabin.

In another embodiment of this aspect, the sensor is arranged to sense an outside condition being one of temperature and humidity outside of the vehicle. In addition, the sensor is arranged to transmit an outside signal of the outside condition. Further to this embodiment, the controller is arranged to receive the outside signal of the outside condition from the sensor. Additionally, the controller is arranged to adjust one of temperature and humidity in the cabin in response to the outside signal and the difference between the actual condition and the set condition.

In yet another embodiment, the antenna extends from the sensor for at least 50 cm. In still another embodiment, the sensor has a response time of between 5 ms and 600 ms.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Embodiments and examples of the present disclosure provide a battery-free wireless climate control unit, and systems and methods of harvesting wireless energy for climate control in a cabin of a vehicle. Such embodiments and examples reduce deployment complexity and provide an more cost-saving way to control climate in a cabin of a vehicle.

Figure 1:
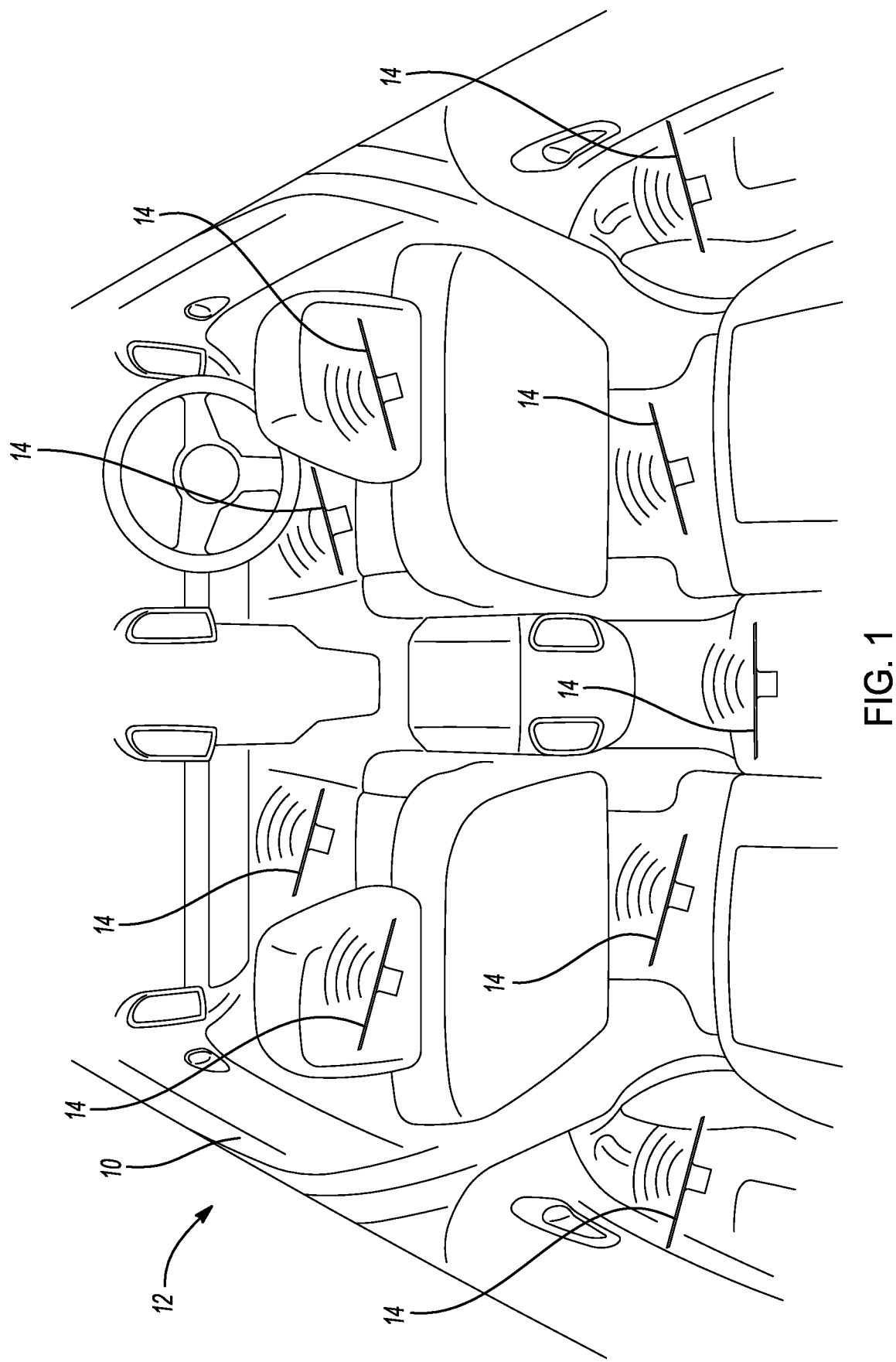
FIG. 1 is a perspective view in a cabin of a vehicle having a battery-free wireless climate control unit for harvesting wireless energy in accordance with one embodiment of the present disclosure.

FIG. 1 illustrates a cabin 10 of a vehicle 12 having battery-free wireless climate control units 14 for harvesting wireless energy and for controlling climate therein in accordance with one embodiment of the present disclosure. As shown, the climate control units 14 are disposed in the cabin 10 of the vehicle 12. Preferably, the climate control units 14 may be disposed in a seat cushion, a head rest, an interior panel, a floorboard, or a ceiling board in the cabin of the vehicle. However, it is understood that the climate control unit 14 may be dispose in any other suitable location in the vehicle without departing from the spirit or scope of the present invention.

Figure 2:
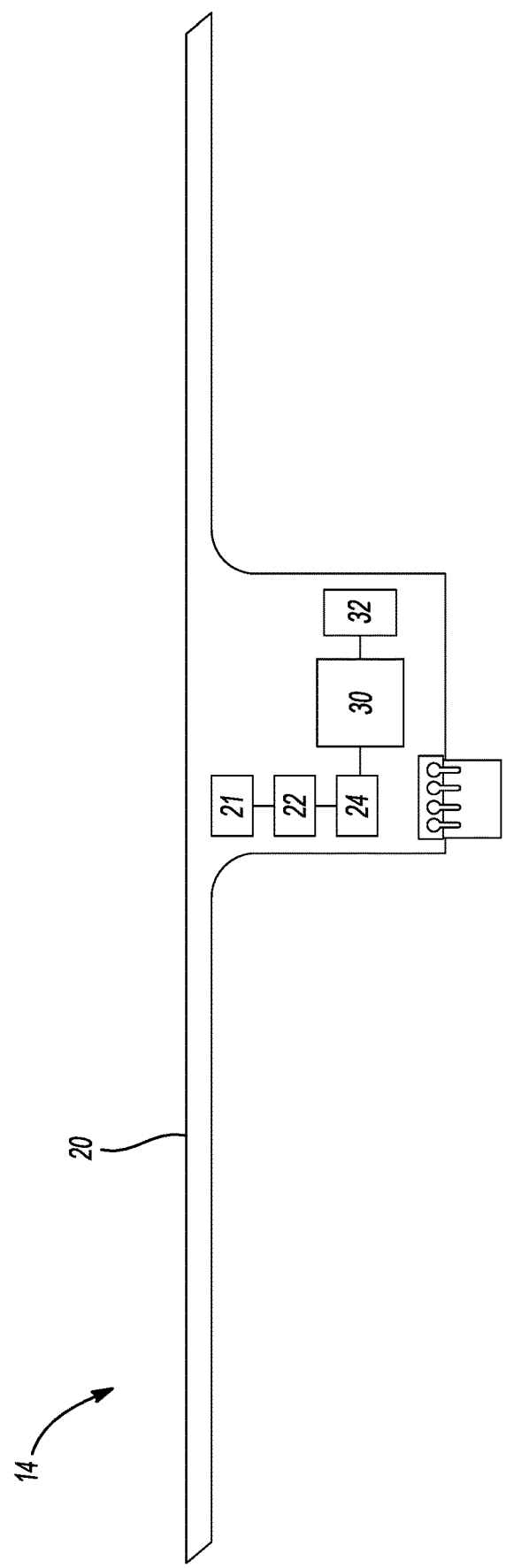
FIG. 2 is a schematic view of the battery-free wireless climate control unit in FIG. 1.

Referring to FIGS. 1-2, the climate control unit 14 comprises an antenna 20 having a transceiver 21 arranged to receive an electromagnetic (EM) signal of EM radiation having EM energy to define an EM current. In this embodiment, the EM signal is a radio frequency (RF) signal carrying both data and energy by way of an RF identification (RFID) protocol. However, it is to be understood that the EM signal may be any other suitable EM signal by way of any other suitable protocol or network such as Bluetooth low energy (BLE), wireless fidelity (WiFi), long-term evolution (LTE), or internet of things (IoT) without departing from the spirit or scope of the present disclosure.

As depicted in FIG. 2, the climate control unit 14 further comprises a wireless energy harvesting (WEH) unit 22 in communication with the antenna 20. From the antenna 20, the WEH unit 22 receives the EM signal and stores the EM energy thereof. In one embodiment, the WEH unit 22 may comprise a capacitor (not shown) arranged to store EM energy of the EM signal. Moreover, the WEH unit 22 is arranged to filter the EM energy to regulate or resist the EM current. For example, the WEH unit 22 may comprise an inducer (not shown) arranged to filter the EM energy for regulating or resisting the EM current. Moreover, the WEH unit 22 is arranged to convert the EM current to direct current. As an example, the WEH unit 22 may comprise a rectifier (not shown) arranged to convert the EM current (here, RF current) to direct current (DC) to be used for powering devices and charging batteries as discussed below. Other components may be used in replacement or in addition to the components of the WEH unit 22 without departing from the spirit or scope of the present disclosure.

As depicted in FIG. 2, the climate control unit 14 further comprises a power management (PM) unit 24 in communication with the WEH unit 22. The PM unit 24 receives the direct current from the WEH unit 22. In this embodiment, the PM unit 24 is arranged to store the direct current to a desired or required DC output power/electrical potential to power devices (discussed below). Additionally, the PM unit 24 is arranged to distribute the direct current. In one example, the PM unit 24 may comprise a storage capacitor (not shown) to store the direct current and a DC-DC converter (not shown) to convert the direct current to a required DC output power. In this embodiment, the PM unit 24 may also comprise an electronic control module arranged to manage a distribution of available energy across a plurality of consuming devices to maximize lifetime of the devices while maintaining efficiency. Other components may be used in replacement or in addition to the components of the PM unit 24 without departing from the spirit or scope of the present disclosure.

Referring to FIG. 2, the climate control unit 14 further comprises a sensor 30 in communication with the PM unit 24 and the antenna 20. In this embodiment, the sensor 30 may be a receiver/transmitter (or transceiver) arranged to receive and transmit signals of a consistent/backscatter protocol (here, RFID) or differing protocols (e.g., BLE, WiFi, LTE, or IoT). Moreover, the sensor 30 is arranged to receive the direct current from the PM unit 24 for power. Furthermore, in one embodiment, the antenna 20 preferably extends from the sensor 30 for a length of at least 50 centimeters (cm).

Upon being powered, the sensor 30 is arranged to sense an actual condition in the cabin 10. That is, the sensor 30 is disposed in an area of the cabin 10 (e.g., a head rest) and is arranged to sense, preferably continually sense, the actual condition of an area adjacent or proximate to the head rest. Preferably, the actual condition is temperature or humidity in the cabin 10. Upon sensing the actual condition, the sensor 30 is arranged to transmit a cabin signal of the actual condition. It is to be understood that the sensor 30 may have a varied response time based on obstructions to the sensor 30 and a location at which the sensor 30 is disposed. Relative to the sensor 30, the varied response time may be defined as a time between being powered and transmitting the cabin signal. For example, the sensor 30 may have a response time of between 5 milliseconds (ms) and 600 ms.

As shown in FIG. 1, a plurality of climate control units 14 is preferably disposed throughout the cabin 10 of the vehicle 12 and thereby the climate control units 14 (via the sensors 30) are arranged to sense a plurality of actual conditions across a plurality of locations in the cabin 10. The sensors 30 are arranged to continually sense the actual conditions over a timeframe. As such in this example, each sensor 30 is arranged to continually transmit cabin signals of the actual condition at a respective location in the cabin 10 over the timeframe. As a result, a plurality of cabin signals is continually transmitted for the actual condition at each location over the timeframe.

Furthermore, the climate control unit 14 comprises a controller 32 in communication with the antenna 20, the sensor 30, and the PM unit 24. In this embodiment, the controller 32 is arranged to receive the direct current from the PM unit 24 for power. Upon being powered, the controller 32 is arranged to receive the cabin signal of the actual condition from the sensor 30. Based on the actual condition, the controller 32 is arranged to adjust one of temperature and humidity in the cabin 10 in response to a difference between the actual condition and a set condition. In this embodiment, the set condition is one of a preset temperature and a preset humidity in the cabin 10. That is, the controller 32 is arranged to store the set condition (e.g., 70F) and compare the actual condition (e.g., 65F) with the set condition. The controller 32 is arranged to adjust the temperature, for example, in the cabin 10 based on the difference.

It is to be understood that the controller 32 may implement algorithms and modules to assist in comparisons and calculations relative to climate control of the cabin 10. It is also to be understood that the controller 32 may be an electronic control unit (ECU), a body control module (BCM), or any other suitable control device without departing from the spirit or scope of the present disclosure.

As depicted in FIG. 1, a plurality of climate control units 14 is preferably disposed throughout the cabin 10 of the vehicle 12 and thereby the climate control units 14 are arranged to sense a plurality of actual conditions across a plurality of locations in the cabin 10. Thus, the controller 32 may receive the plurality cabin 10 signals of actual conditions from the sensors 30 across the plurality of locations in the cabin 10.

Figure 3:
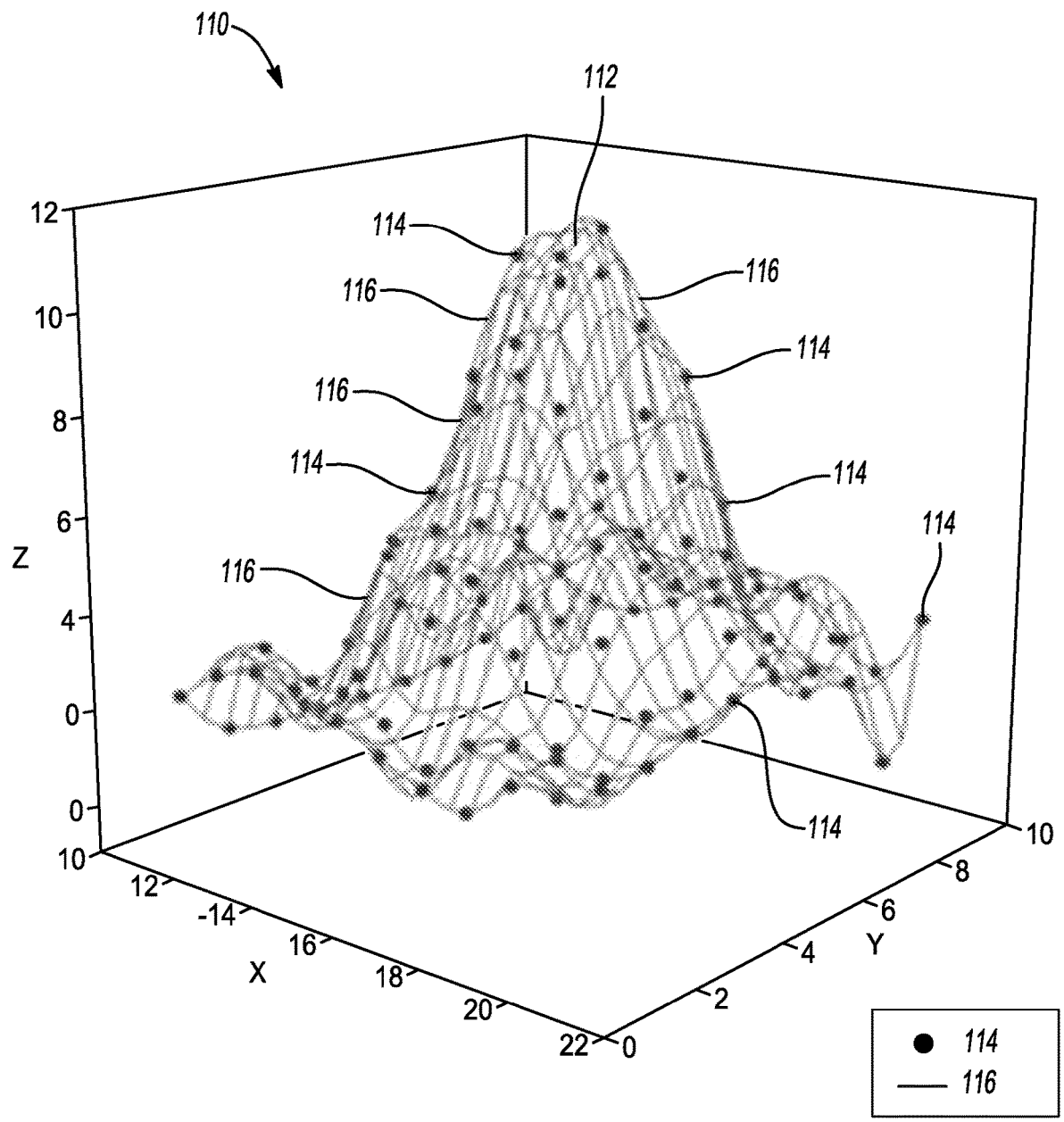
FIG. 3 is a heat map graph of space vs. time of the cabin for climate control.

FIG. 3 depicts a heat map graph 110 of space vs. time of climate in the cabin 10. With respect to the response time, the controller 32 is arranged to create a heat map 112 of the cabin 10 from at least a portion of the plurality of actual conditions 114 by way of an interpolation technique providing estimated or interpolated conditions 116 of temperature or humidity. The estimated conditions 116 may be implemented by the controller 32 for more accurate and efficient climate control in the cabin 10. In this embodiment, the interpolation technique is performed with respect to area in the cabin (x-axis), time (y-axis), and actual conditions (z-axis). Moreover, since the plurality of cabin signals received may be sparse due to the response time of each sensor 30, the controller 32 may be arranged to create the heat map 112 from sparse measurements of the cabin 10 to assist with controlling climate in the cabin 10.

In this embodiment and without departing from the spirit or scope of the present disclosure, the interpolation technique may be a global technique to interpolate values using all available data, a local technique to estimate values from neighboring points only, or any other suitable technique to assist in creating the heat map for climate control of the cabin 10. Furthermore, the controller 32 may implement the interpolation technique by way of algorithms and modules.

Referring back to FIG. 2, the controller 32 is arranged to adjust one of temperature and humidity in the cabin 10 with the interpolation technique in response to a difference between the plurality of the actual conditions and a corresponding plurality of the set conditions with the area of the cabin 10. It is to be understood that the controller 32 may implement algorithms and modules to assist in comparisons and calculations relative to climate control of the cabin 10.

In one embodiment, the sensor 30 may be arranged to sense an outside condition being one of temperature and humidity outside of the vehicle 12. As such, the sensor 30 may be arranged to transmit an outside signal of the outside condition. In this example, the controller 32 is arranged to receive the outside signal of the outside condition from the sensor 30. Moreover, the controller 32 is arranged to adjust one of temperature and humidity in the cabin 10 in response to the outside signal and the difference between the actual condition and the set condition.

Figure 4A:
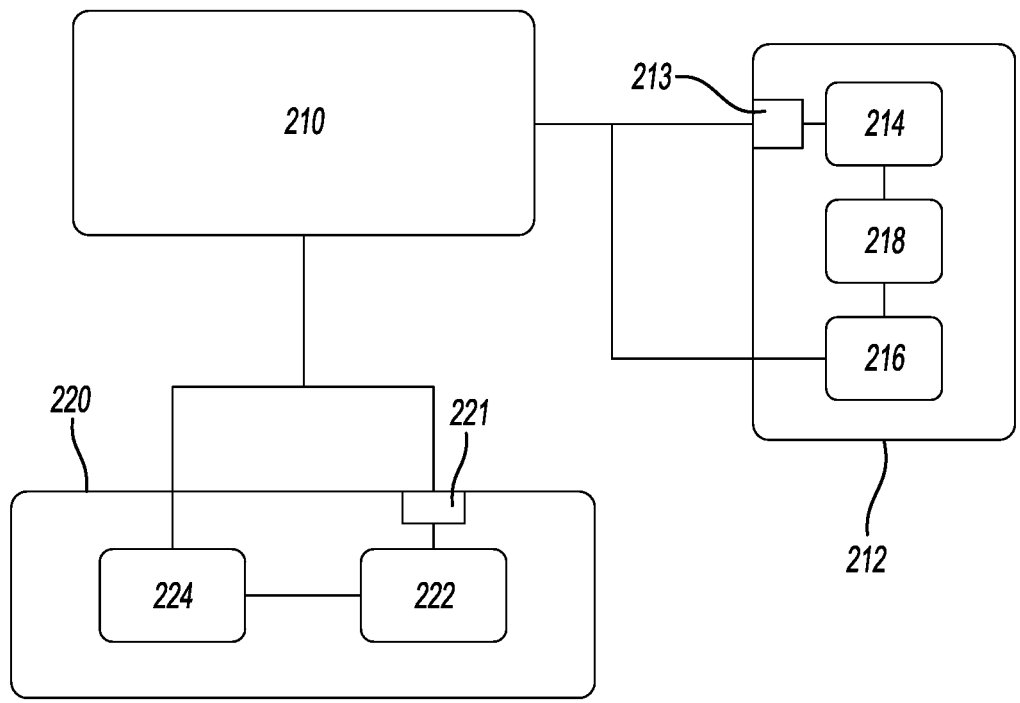
FIG. 4A is a schematic diagram of a general system in the vehicle of FIG. 1 having the climate control unit for harvesting wireless energy.
Figure 4B:
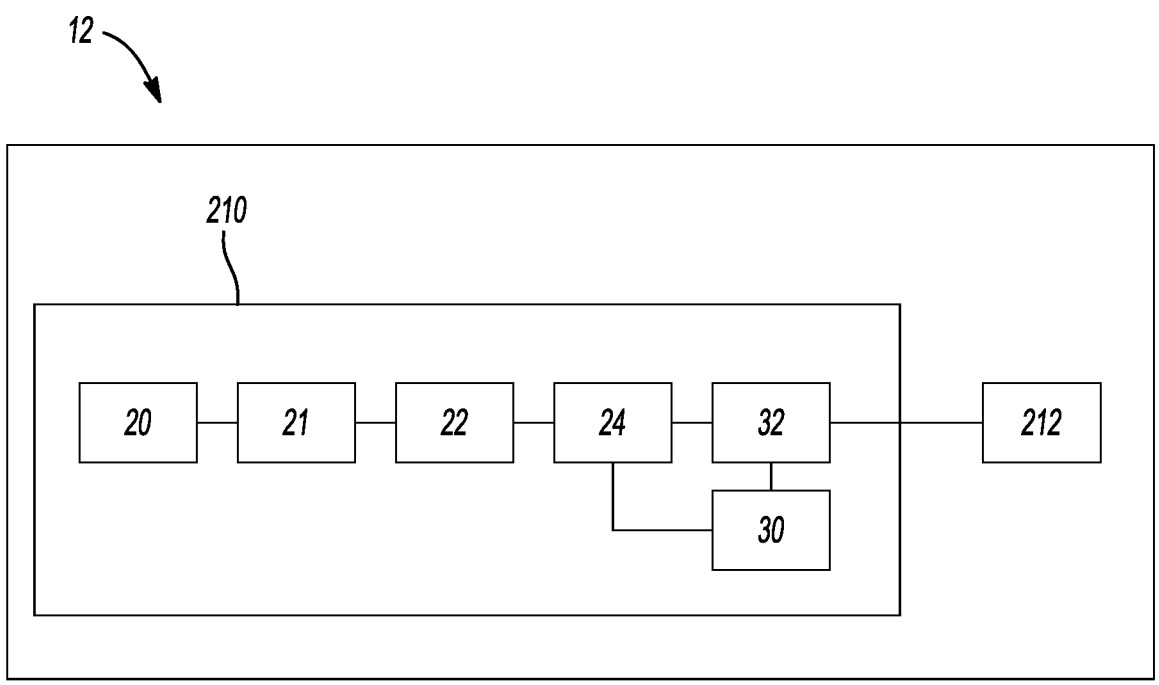
FIG. 4B is a schematic diagram of a system for harvesting wireless energy for climate control in the vehicle of FIG. 1 in accordance with one embodiment of the present disclosure.

FIGS. 4A-4B depict a system 210 for harvesting wireless energy for climate control in a cabin 10 of a vehicle 12 in accordance with another embodiment of the present disclosure. As shown, the system 210 implements the climate control unit 14 described above and depicted in FIGS. 1 and 2. Additionally, the system 210 comprises a heating, ventilation, and cooling (HVAC) unit 212 disposed in the vehicle 12 for heating, venting, and cooling the cabin 10 of the vehicle 12. The HVAC unit 212 may comprise an HVAC transceiver 213, an air conditioning (A/C) unit 214 connected to the transceiver, a heating unit 216 connected to the A/C unit 214 and the HVAC transceiver 213, and flap controls/activators 218 connect to each of the heating and A/C units 212, 214. Moreover, the system 210 comprises a human machine interface (HMI) unit 220 disposed in the vehicle 12 for driver/occupant interaction. The HMI unit 220 may comprise a HMI transceiver 221, a user input component 222 in connection with the transceiver and a screen output component 224 connected to the HMI transceiver 221. Other components may be used in replacement or in addition to the components of the HVAC unit 212 and the HMI unit 220 without departing from the spirit or scope of the present disclosure.

As illustrated in FIGS. 4A-4B, the system 210 further comprises a battery-free wireless climate control unit 14 for harvesting wireless energy and for controlling climate in the cabin 10 of the vehicle 12 in accordance with one embodiment of the present disclosure. As shown in FIG. 4A, the climate control unit 14 is in communication with the HVAC unit 212 and the HMI unit 220. In this embodiment, the climate control unit 14 of the system 210 is preferably the climate control unit 14 shown in FIGS. 1-2 and described above.

Referring to FIG. 4B, each climate control unit 14 is disposed in the cabin 10 of the vehicle 12. Preferably, the climate control unit 14 may be disposed in a seat cushion, a head rest, an interior panel, a floorboard, or a ceiling board in the cabin 10 of the vehicle 12. However, it is understood that the climate control unit 14 may be dispose in any other suitable location in the vehicle without departing from the spirit or scope of the present invention.

Referring to FIGS. 2 and 4B, the climate control unit 14 comprises an antenna 20 having a transceiver 21 arranged to receive an electromagnetic (EM) signal of EM radiation having EM energy to define an EM current. In this embodiment, the EM signal is a radio frequency (RF) signal carrying both data and energy by way of an RF identification (RFID) protocol. However, it is to be understood that the EM signal may be any other suitable EM signal by way of any other suitable protocol or network such as Bluetooth low energy (BLE), wireless fidelity (WiFi), long-term evolution (LTE), or internet of things (IOT) without departing from the spirit or scope of the present disclosure.

As depicted in FIGS. 2 and 4B, the climate control unit 14 further comprises a wireless energy harvesting (WEH) unit 22 in communication with the antenna 20. From the antenna 20, the WEH unit 22 receives the EM signal and stores the EM energy thereof. In one embodiment, the WEH unit 22 may comprise a capacitor (not shown) arranged to store EM energy of the EM signal. Moreover, the WEH unit 22 is arranged to filter the EM energy to regulate or resist the EM current. For example, the WEH unit 22 may comprise an inducer (not shown) arranged to filter the EM energy for regulating or resisting the EM current. Moreover, the WEH unit 22 is arranged to convert the EM current to direct current. As an example, the WEH unit 22 may comprise a rectifier (not shown) arranged to convert the EM current (here, RF current) to direct current (DC) to be used for powering devices and charging batteries as discussed below.

Other components may be used in replacement or in addition to the components of the WEH unit 22 without departing from the spirit or scope of the present disclosure.

As depicted in FIGS. 2 and 4B, the climate control unit 14 further comprises a power management (PM) 24 unit in communication with the WEH unit 22. The PM unit 24 receives the direct current from the WEH unit 22. In this embodiment, the PM unit 24 is arranged to store the direct current to a desired or required DC output power/electrical potential to power devices (discussed below). Additionally, the PM unit 24 is arranged to distribute the direct current. In one example, the PM unit 24 may comprise a storage capacitor (not shown) to store the direct current and a DC-DC converter (not shown) to convert the direct current to a required DC output power. In this embodiment, the PM unit 24 may also comprise an electronic control module arranged to manage a distribution of available energy across a plurality of consuming devices to maximize lifetime of the devices and while maintaining efficiency. Other components may be used in replacement or in addition to the components of the PM unit 24 without departing from the spirit or scope of the present disclosure.

Referring to FIGS. 2 and 4B, the climate control unit 14 further comprises a sensor 30 in communication with the PM unit 24 and the antenna 20. In this embodiment, the sensor 30 may be a receiver/transmitter (or transceiver) arranged to receive and transmit signals of a consistent/backscatter protocol (here, RFID) or differing protocols (e.g., BLE, WiFi, LTE, or IoT). Moreover, the sensor 30 is arranged to receive the direct current from the PM unit 24 for power. Furthermore, in one embodiment, the antenna 20 preferably extends from the sensor 30 for a length of at least 50 centimeters (cm).

Upon being powered, the sensor 30 is arranged to sense an actual condition in the cabin 10. That is, the sensor 30 is disposed in an area of the cabin 10 (e.g., a head rest) and is arranged to sense, preferably continually sense, the actual condition of an area adjacent or proximate to the head rest. Preferably, the actual condition is temperature or humidity in the cabin 10. Upon sensing the actual condition, the sensor 30 is arranged to transmit a cabin signal of the actual condition. It is to be understood that the sensor 30 may have a varied response time based on a location at which the sensor 30 is disposed and obstructions to the sensor 30. Relative to the sensor 30, the varied response time may be defined as a time between being powered and transmitting the cabin signal. For example, the sensor 30 may have a response time of between 5 milliseconds (ms) and 600 ms.

Referring to FIGS. 1 and 4B, a plurality of climate control units 14 is preferably disposed throughout the cabin 10 of the vehicle 12 and thereby the climate control units 14 (via the sensors 30) are arranged to sense a plurality of actual conditions across a plurality of locations in the cabin 10. The sensors 30 are arranged to continually sense the actual conditions over a timeframe. As such in this example, each sensor 30 is arranged to continually transmit cabin signals of the actual condition at a respective location in the cabin 10 over the timeframe. As a result, a plurality of cabin signals is continually transmitted for the actual condition of each location over the timeframe.

Furthermore, referring to FIGS. 2 and 4B, the climate control unit 14 comprises a controller 32 in communication with the antenna 20, the sensor 30, and the PM unit 24. In this embodiment, the controller 32 is arranged to receive the direct current from the PM unit 24 for power. Upon being powered, the controller 32 is arranged to receive the cabin signal of the actual condition from the sensor 30.

Based on the actual condition, the controller 32 is arranged to activate the HVAC unit 212 (FIG. 4A) to adjust one of temperature and humidity in the cabin 10 in response to a difference between the actual condition and a set condition. In operation, the controller 32 (via a transceiver or a current driver) may send a drive signal to the HVAC unit 212 which may activate flap controls and activators 218 to thereby provide heating or cooling to the cabin 10 accordingly. In this embodiment, the set condition is one of a preset temperature and a preset humidity in the cabin 10. That is, the set condition may be preset by an occupant via the HMI unit 220 (FIG. 4A). Further, the controller 32 may be arranged to store the set condition (e.g., 70F) and compare the actual condition (e.g., 65F) with the set condition.

It is to be understood that the controller 32 may implement algorithms and modules to assist in comparisons and calculations relative to climate control of the cabin 10. It is also to be understood that the controller 32 may be an electronic control unit (ECU), a body control module (BCM), or any other suitable control device without departing from the spirit or scope of the present disclosure.

As depicted in FIGS. 1 and 4B, a plurality of climate control units 14 is preferably disposed throughout the cabin 10 of the vehicle 12 and thereby the climate control units 14 are arranged to sense a plurality of actual conditions across a plurality of locations in the cabin 10. Thus, the controller 32 may receive the plurality of cabin signals of the actual conditions from the sensors 30 across the plurality of locations in the cabin 10.

Referring to FIGS. 3 and 4A, with respect to the response time, the controller 32 is arranged to create the heat map graph 110 comprising the heat map 112 of the cabin 10 from at least a portion of the plurality of actual conditions 114 by way of an interpolation technique to provide estimated or interpolated conditions 116. The controller 32 uses the estimated conditions 116 to more effectively and efficiently control climate in the cabin 10. In this embodiment, the interpolation technique is performed with respect to area in the cabin (x-axis), time (y-axis), and actual conditions in the cabin (z-axis). Moreover, since the plurality of cabin signals received may be sparse due to the response time of each sensor 30, the controller 32 may be arranged to create the heat map 112 from sparse measurements of the cabin 10 to assist with controlling climate in the cabin 10.

In this embodiment and without departing from the spirit or scope of the present disclosure, the interpolation technique may be a global technique to interpolate values using all available data, a local technique to estimate values from neighboring points only, or any other suitable technique to assist in creating the heat map for climate control of the cabin 10. Furthermore, the controller 32 may implement the interpolation technique by way of algorithms and modules.

Referring back to FIGS. 4A and 4B, the controller 32 is arranged to activate the HVAC unit 212 to adjust one of temperature and humidity in the cabin 10 with the interpolation technique in response to a difference between the plurality of the actual conditions and a corresponding plurality of the set conditions with the area of the cabin 10. It is to be understood that the controller 32 may implement algorithms and modules to assist in comparisons and calculations relative to climate control of the cabin 10. In operation, the controller 32 (via a transceiver or a current driver) may send a drive signal to the HVAC unit 212 which may activate flap controls and activators 218 to thereby provide heating or cooling to the cabin 10 accordingly.

Figure 5:
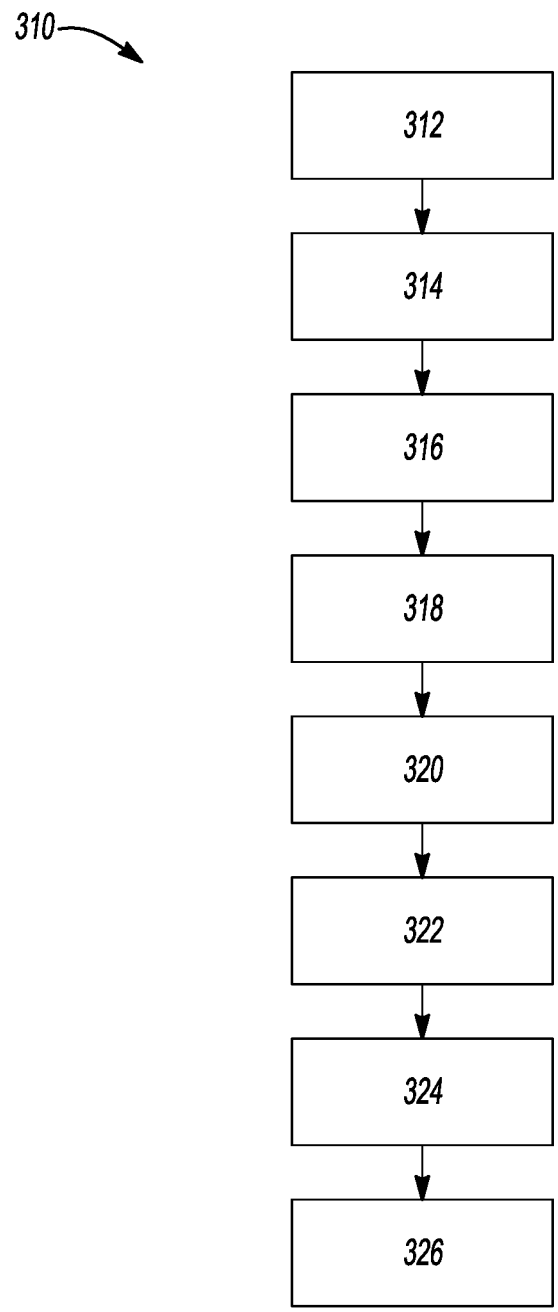
FIG. 5 is a flowchart of a method of harvesting wireless energy for climate control in the vehicle of FIG. 1 in accordance with one example of the present disclosure.

FIG. 5 illustrates a flowchart of a method of harvesting wireless energy for climate control in a cabin 10 of a vehicle 12. In this example, the method implements the system 210 and climate control unit 14 described above and shown in FIGS. 1, 2, 4A and 4B. As shown in block 312, the method comprises providing the HVAC unit 212, the HMI unit 220, and the climate control unit 14 described herein. As discussed above, the climate control unit 14 comprises the antenna 20, the WEH unit 22, the PM unit 24, the sensor 30, and the controller 32.

In block 314, the method further comprises (via the antenna 20) receiving an electromagnetic (EM) signal of EM radiation having EM energy to define an EM current. In this example, the EM signal is a radio frequency (RF) signal carrying both data and energy by way of an RF identification (RFID) protocol. However, it is to be understood that the EM signal may be any other suitable EM signal by way of any other suitable protocol or network such as Bluetooth low energy (BLE), wireless fidelity (WiFi), long-term evolution (LTE), or internet of things (IOT) without departing from the spirit or scope of the present disclosure.

In block 316, the method further comprises (via the WEH unit 22) filtering the EM energy to regulate the EM current. Moreover, in block 318, the method further comprises (via the WEH unit 22), after filtering, converting the EM current to direct current. From the antenna 20, the WEH unit 22 receives the EM signal and stores the EM energy thereof. In one embodiment, the WEH unit 22 may comprise a capacitor arranged to store EM energy of the EM signal. Moreover, the WEH unit 22 is arranged to filter the EM energy to regulate or resist the EM current. For example, the WEH unit 22 may comprise an inducer arranged to filter the EM energy for regulating or resisting the EM current. Moreover, the WEH unit 22 is arranged to convert the EM current to direct current. As an example, the WEH unit 22 may comprise a rectifier (not shown) arranged to convert the EM current (here, RF current) to direct current (DC) to be used for powering devices and charging batteries as discussed below. Other components may be used in replacement or in addition to the components of the WEH unit 22 without departing from the spirit or scope of the present disclosure.

In block 320, the method further comprises (via the PM unit 24) storing the direct current for powering the battery-free wireless sensing unit. In block 322, the method comprises (via the PM unit 24) powering the battery-free wireless sensor 30 with the direct current. In operation, the PM unit 24 receives the direct current from the WEH unit 22. In this example, the PM unit 24 is arranged to store the direct current to a desired or required DC output power/electrical potential to power devices such as the sensor 30 and controller 32. Additionally, the PM unit 24 is arranged to distribute the direct current. In one example, the PM unit 24 may comprise a storage capacitor to store the direct current and a DC-DC converter to convert the direct current to a required DC output power. In this embodiment, the PM unit 24 may also comprise an electronic control module arranged to manage a distribution of available energy across a plurality of consuming devices to maximize lifetime of the devices and while maintaining efficiency. Other components may be used in replacement or in addition to the components of the PM unit 24 without departing from the spirit or scope of the present disclosure.

After powering the battery-free wireless sensor 30, in block 324, the method further comprises (via the sensor 30) sensing an actual condition in the cabin 10. The actual condition is one of actual temperature and actual humidity in the cabin 10. As in the examples above, the sensor 30 may be a receiver/transmitter (or transceiver) arranged to receive and transmit signals of a consistent/backscatter protocol (here, RFID) or differing protocols (e.g., BLE, WiFi, LTE, or IoT). Moreover, the sensor 30 is arranged to receive the direct current from the PM unit 24 for power.

Moreover, the sensor 30 is disposed in an area of the cabin 10 (e.g., a head rest) and is arranged to sense, preferably continually sense, the actual condition of an area adjacent or proximate to the head rest. Preferably, the actual condition is temperature or humidity in the cabin 10. Upon sensing the actual condition, the sensor 30 is arranged to transmit a cabin signal of the actual condition to the controller 32.

It is to be understood that the sensor 30 may have a varied response time based on a location at which the sensor 30 is disposed and obstructions to the sensor 30. Relative to the sensor 30, the varied response time may be defined as a time between being powered and transmitting the cabin signal. For example, the sensor 30 may have a response time of between 5 milliseconds (ms) and 600 ms.

Furthermore in block 326, the method comprises (via the controller 32) activating the HVAC unit 212 to adjust one of temperature and humidity in the cabin 10 in response to a difference between the actual condition and a set condition. The set condition is one of a preset temperature and a preset humidity in the cabin 10. In operation, the controller 32 (via a transceiver or a current driver) may send a drive signal to the HVAC unit 212 which may activate flap controls and activators 218 to thereby provide heating or cooling to the cabin 10 accordingly. In this example, the set condition is one of a preset temperature and a preset humidity in the cabin 10. That is, the set condition may be preset by an occupant via the HMI unit 220 (FIG. 4A). Further, the controller 32 may be arranged to store the set condition (e.g., 70F) and compare the actual condition (e.g., 65F) with the set condition.

It is to be understood that the controller 32 may implement algorithms and modules to assist in comparisons and calculations relative to climate control of the cabin 10. It is also to be understood that the controller 32 may be an electronic control unit (ECU), a body control module (BCM), or any other suitable control device without departing from the spirit or scope of the present disclosure.

As discussed above, a plurality of climate control units 14 is preferably disposed throughout the cabin 10 of the vehicle 12 and thereby the climate control units 14 are arranged to sense a plurality of actual conditions across a plurality of locations in the cabin 10. Thus, the controller 32 may receive the plurality cabin signals of actual conditions from the sensors 30 across the plurality of locations in the cabin 10. In this example, the step in block 324 of sensing the actual condition in the cabin 10 comprises sensing a plurality of actual conditions across a plurality of locations in the cabin 10.

Moreover, the step in block 326 of activating the HVAC unit 212 to adjust one of temperature and humidity in the cabin 10 comprises creating the heat map 112 (FIG. 3) of the cabin 10 from at least a portion of the plurality of actual conditions by way of the interpolation technique (discussed above) with respect to the actual conditions, area of the cabin 10, and time. Furthermore, the step in block 326 of activating the HVAC unit 212 to adjust one of temperature and humidity in the cabin 10 further comprises adjusting one of temperature and humidity in the cabin 10 with the interpolation technique in response to a difference between the plurality of the actual conditions and a corresponding plurality of the set conditions with the area of the cabin 10.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A battery-free wireless climate control unit for harvesting wireless energy and for controlling climate in a cabin of a vehicle, the climate control unit comprising:
   an antenna having a transceiver arranged to receive an electromagnetic (EM) signal of EM radiation having EM energy to define an EM current;
   a wireless energy harvesting (WEH) unit in communication with the antenna, the WEH unit arranged to filter the EM energy to regulate the EM current and arranged to convert the EM current to direct current;
   a power management (PM) unit in communication with the WEH unit, the PM unit arranged to store the direct current and arranged to distribute the direct current;
   a sensor in communication with the PM unit, the sensor arranged to receive the direct current from the PM unit for power, the sensor arranged to sense an actual condition being one of temperature and humidity in the cabin, the sensor arranged to transmit a cabin signal of the actual condition;
   wherein the sensor is arranged to sense a plurality of actual conditions across a plurality of locations in the cabin;
   wherein the sensor has a response time of at least 1 millisecond (ms) due to the varied response time of the sensor based on obstructions to the sensor and a location at which the sensor is disposed;
   a controller in communication with the sensor and the PM unit, the controller arranged to receive the direct current from the PM unit for power, the controller arranged to receive the cabin signal of the actual condition from the sensor, the controller arranged to adjust one of temperature and humidity in the cabin in response to a difference between the actual condition and a set condition, the set condition being one of a preset temperature and a preset humidity in the cabin; and
   wherein the controller is arranged to create a heat map of the cabin from at least a portion of the plurality of actual conditions by way of an interpolation technique with respect to time and area of the cabin, the controller is arranged to adjust one of temperature and humidity in the cabin with the interpolation technique in response to a difference between the plurality of the actual conditions and a corresponding plurality of the set conditions with the area of the cabin, and the heat map is created from sparse measurements of the cabin to assist with controlling climate in the cabin due to the varied response time of the sensor.

2. A system for harvesting wireless energy for climate control in a cabin of a vehicle, the system comprising:
   a heating, ventilation, and cooling (HVAC) unit disposed in the vehicle for heating, venting, and cooling the cabin of the vehicle; and
   a climate control unit in communication with the HVAC unit, the climate control unit comprising:
     an antenna having a transceiver arranged to receive an electromagnetic (EM) signal of EM radiation having EM energy to define an EM current;
     a wireless energy harvesting (WEH) unit in communication with the antenna, the WEH unit arranged to filter the EM energy to regulate the EM current and arranged to convert the EM current to direct current;

a power management (PM) unit in communication with the WEH unit, the PM unit arranged to store the direct current and arranged to distribute the direct current;

a sensor in communication with the PM unit, the sensor arranged to receive the direct current from the PM unit for power, the sensor arranged to sense an actual condition being one of temperature and humidity in the cabin, the sensor arranged to transmit a cabin signal of the actual condition;

wherein the sensor is arranged to sense a plurality of actual conditions across a plurality of locations in the cabin;

wherein the sensor has a response time of at least 1 millisecond (ms) due to the varied response time of the sensor based on obstructions to the sensor and a location at which the sensor is disposed;

a controller in communication with the sensor and the PM unit, the controller arranged to receive the direct current from the PM unit for power, the controller arranged to receive the cabin signal of the actual condition from the sensor, the controller arranged to activate the HVAC unit to adjust one of temperature and humidity in the cabin in response to a difference between the actual condition and a set condition, the set condition being one of a preset temperature and a preset humidity in the cabin; and wherein the controller is arranged to create a heat map of the cabin from at least a portion of the plurality of actual conditions by way of an interpolation technique with respect to time and area of the cabin, the controller is arranged to adjust one of temperature and humidity in the cabin with the interpolation technique in response to a difference between the plurality of the actual conditions and a corresponding plurality of the set conditions with the area of the cabin, and the heat map is created from sparse measurements of the cabin to assist with controlling climate in the cabin due to the varied response time of the sensor.

3. The system of claim 2 wherein the sensor has a response time between 5 milliseconds and 600 milliseconds.

\* \* \* \* \*